US012633175B2

(12) United States Patent (10) Patent No.: US 12,633,175 B2
Subramanian (45) Date of Patent: May 19, 2026

(54) ESTIMATION OF A RIDE HEIGHT OF AN AXLE

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 203 days.

(21) Appl. No.: 18/538,481

(22) Filed: Dec. 13, 2023

(65) Prior Publication Data

US 2024/0203172 A1 Jun. 20, 2024

(30) Foreign Application Priority Data

Dec. 14, 2022 (EP) ..................................... 22213448

(51) Int. Cl.
*G07C 5/02* (2006.01)
*B60K 17/36* (2006.01)
*B60W 30/14* (2006.01)
*B60W 40/12* (2012.01)

(52) U.S. Cl.
CPC ................ *G07C 5/02* (2013.01); *B60K 17/36* (2013.01); *B60W 30/143* (2013.01); *B60W 40/12* (2013.01); *B60W 2510/22* (2013.01); *B60W 2520/28* (2013.01)

(58) Field of Classification Search
CPC .......... G07C 5/02; B60K 17/36; B60K 17/22; B60W 30/143; B60W 40/12; B60W 2510/22; B60W 2520/28; B60B 35/14;

B60G 2200/30; B60G 2200/422; B60G 2204/414; B60G 2300/026; B60G 2400/051; B60G 2400/208; B60G 2400/252; B60G 2400/30; B60G 2800/70; B60G 17/019

See application file for complete search history.

(56) References Cited

U.S. PATENT DOCUMENTS 6,015,019 A * 1/2000 Grimes .................. B60K 17/28
180/324
6,085,853 A * 7/2000 Wernick ................. B60K 17/36
180/24.09

(Continued)

OTHER PUBLICATIONS

Extended European Search Report in corresponding European Application No. 22213448.8 dated Jun. 16, 2023 (11 pages).

*Primary Examiner* — Sze-Hon Kong

(74) *Attorney, Agent, or Firm* — Jeffri A. Kaminski; Venable LLP

(57) ABSTRACT

A computer system comprising a processor device configured estimate a current ride height of a first axle of a vehicle is provided. The processor device is configured to obtain a variation in rotational speed of a first drive shaft. The first drive shaft is driven by a second drive shaft rotating a mechanical joint connected to both the first drive shaft and the second drive shaft. The processor device is configured to estimate the current ride height of the first axle based on the variation in rotational speed of the first drive shaft, an obtained initial ride height of the first axle, and an obtained condition signal. The condition signal indicates a second angle of the second drive shaft, or indicates a ride height of a second axle.

14 Claims, 3 Drawing Sheets

(56)                    References Cited

U.S. PATENT DOCUMENTS

| | | | |
|---|---|---|---|
| 6,345,680 B1 * | 2/2002 | Hill | B60K 17/24 |
| | | | 180/209 |
| 6,345,826 B1 * | 2/2002 | Kurzeja | B60G 17/0523 |
| | | | 280/5.514 |
| 6,578,657 B2 * | 6/2003 | Baxter, Jr. | B60K 17/22 |
| | | | 464/178 |
| 6,832,143 B2 * | 12/2004 | Trudeau | B60G 13/16 |
| | | | 701/87 |
| 2003/0023357 A1 * | 1/2003 | Trudeau | B60G 17/0523 |
| | | | 701/37 |
| 2003/0183439 A1 * | 10/2003 | Penzotti | B60K 17/22 |
| | | | 180/379 |
| 2004/0084860 A1 * | 5/2004 | Svartz | B60G 9/003 |
| | | | 280/6.159 |
| 2015/0258871 A1 * | 9/2015 | Remboski | B60G 17/052 |
| | | | 280/124.16 |
| 2021/0394574 A1 * | 12/2021 | Paielli | G01D 5/2046 |
| 2024/0051365 A1 * | 2/2024 | Oishi | B60G 11/27 |

* cited by examiner

ESTIMATION OF A RIDE HEIGHT OF AN AXLE

TECHNICAL FIELD

The disclosure relates generally to a ride height estimation. In particular aspects, the disclosure relates to estimation of a ride height of an axle based on a variation in rotational speed of a drive shaft. The disclosure can be applied in heavy-duty vehicles, such as trucks, buses, and construction equipment. Although the disclosure may be described with respect to a particular vehicle, the disclosure is not restricted to any particular vehicle.

BACKGROUND

A ride height for an axle may be used for different purposes of a vehicle, e.g., when adjusting a suspension, controlling comfort of a vehicle, used for estimating fuel efficiency, traction control/optimization, tire wear optimization, etc.

Estimating the ride height may be particularly important for heavy-duty vehicles. This is since ride height is the main source for estimating several suspension kinematics/dynamics characteristics which affects vehicle dynamics. Using the ride height the vehicle controls can be improved.

To estimate the ride height, the vehicle may be equipped with sensors for estimating the ride height of the axle, e.g., any one or more out of:

- a pressure-based sensor on an airbag of a suspension arrangement. When the pressure increases or decreases, the ride height can be estimated to be increased and decreased in a corresponding manner.
- a sensor arranged in the suspension arrangement, e.g., a control arm displacement sensor, sensing a control arm of the suspension arrangement. The control arm moves e.g., up and down, with the actuation of the suspension arrangement, and the ride height can then be estimated based on the movement of the control arm to be increased and decreased in a corresponding manner.
- Other sensors: e.g., cameras, lasers, ultrasound, etc. may also be used to estimate a ride height of the axle.

Irrespective of which sensors and/or techniques are used to estimate the ride height of the axle, the sensors and/or techniques may be inefficient as they may be expensive and/or inaccurate.

For autonomous vehicles, in particular for Level 4 (L4) autonomous vehicles, estimating the ride height may also require redundancy. This is since the ride height must be available for the L4 autonomous vehicles at all times, or an emergency stop may be needed. Hence, if some sensors are inefficient or if they are prone to be unavailable for the same source of error, e.g., if both depend on the suspension arrangement, then the autonomous vehicles would be in risk of losing productivity.

Hence, there is a strive to improve efficiency of ride height estimation of axles.

SUMMARY

According to a first aspect of the disclosure, a computer system comprising a processor device configured estimate a current ride height of a first axle of a vehicle is provided. The first axle is connected to a first drive shaft. The first drive shaft is driven by a second drive shaft, by the second drive shaft rotating a mechanical joint connected to both the first drive shaft and the second drive shaft. The first drive shaft has a first angle to the mechanical joint. The second drive shaft has a second angle to the mechanical joint. The current ride height of the first axle is at least partly determined by the first angle and the second angle.

The processor device is further configured to obtain an initial ride height of the first axle.

The processor device is further configured to, for a predetermined time period, obtain a variation in rotational speed of the first drive shaft. The variation in rotational speed is caused at least partially by the first angle and the second angle.

The processor device is further configured to obtain a condition signal indicating any one or more out of:

- that the second angle is fixed within an interval of a predetermined error margin, and
- a current ride height of a second axle. The current ride height of the second axle at least partly determines the second angle.

The processor device is further configured to estimate the current ride height of the first axle based on the variation in rotational speed of the first drive shaft, the obtained initial ride height of the first axle, and the condition signal.

The first aspect of the disclosure may respectively seek to improve efficiency of estimating a ride height. A technical benefit may include a more efficient ride height estimation. This is since the ride height estimation may be performed based on easy to access parameters such as variation in rotational speed of the first drive shaft, the obtained initial ride height of the first axle, and the condition signal. The ride height may be estimated using the variation of rotational speed of the first drive shaft since the variation in rotational speed is caused at least partially by the first angle and the second angle. In other words, there is a relationship between the variation in rotational speed and the ride height of the first axle which is efficiently utilized for estimating the ride height.

According to a second aspect of the disclosure, a computer-implemented method for estimating a current ride height of a first axle of a vehicle is provided. The first axle is connected to a first drive shaft. The first drive shaft is driven by a second drive shaft, by the second drive shaft rotating a mechanical joint connected to both the first drive shaft and the second drive shaft. The first drive shaft has a first angle to the mechanical joint. The second drive shaft has a second angle to the mechanical joint. The current ride height of the first axle is at least partly determined by the first angle and the second angle.

The method comprises, by a processor device of a computer system, obtaining an initial ride height of the first axle.

The method comprises, by the processor device, for a predetermined time period, obtaining a variation in rotational speed of the first drive shaft. The variation in rotational speed is caused at least partially by the first angle and the second angle.

The method comprises, by the processor device, obtaining a condition signal indicating any one or more out of:

- that the second angle is fixed within an interval of a predetermined error margin, and
- a current ride height of a second axle. The current ride height of the second axle at least partly determines the second angle.

The method comprises, by the processor device, estimating the current ride height of the first axle based on the variation in rotational speed of the first drive shaft. The obtained initial ride height of the first axle, and the condition signal.

The second aspect of the disclosure may respectively seek to improve efficiency of estimating a ride height. A technical benefit may include a more efficient ride height estimation. This is since the ride height estimation may be performed based on easy to access parameters such as variation in rotational speed of the first drive shaft, the obtained initial ride height of the first axle, and the condition signal. The ride height may be estimated using the variation of rotational speed of the first drive shaft since the variation in rotational speed is caused at least partially by the first angle and the second angle. In other words, there is a relationship between the variation in rotational speed and the ride height of the first axle which is efficiently utilized for estimating the ride height.

In some examples, obtaining the variation in rotational speed of the first drive shaft comprises obtaining the rotational speed of the first drive shaft during the predetermined time period from a sensor measuring the rotation of the first drive shaft.

In some examples, obtaining the variation in rotational speed of the first drive shaft comprises:

obtaining a first wheel speed of a first wheel of the first axle, obtaining a second wheel speed of a second wheel of the second axle, and estimating the variation in rotational speed of the first drive shaft by comparing the first wheel speed and the second wheel speed during the predetermined time period.

In this way, the variation of the rotational speed of the first drive shaft may be estimated efficiently, causing a more efficient ride height estimation.

In some examples, estimating the current ride height of the first axle comprises using a predefined model for estimating the current ride height of the first axle by the use of one or more inputs, the one or more inputs comprising at least the variation in rotational speed of the first drive shaft, and the obtained initial ride height of the first axle.

In this way, the ride height estimation of the first axle may be performed more efficiently. This is since the predefined model may be predefined to immediately output a ride height based on the inputted variation in rotational speed of the first drive shaft, and the obtained initial ride height of the first axle.

In some examples, using the predefined model comprises: when the condition signal indicates the current ride height for the second axle, the one or more inputs further comprises an indication of the current ride height for the second axle and/or an indication of the second angle as derived based on the current ride height of the second axle and the obtained initial ride height of the first axle.

In this way, the ride height estimation of the first axle may be performed more efficiently and/or accurately. This is since when the condition signal indicates the current ride height for the second axle and/or the second angle may be dynamically changing which means that the ride height of the second axle and/or the second angle may be needed as inputs in the predefined model. This is since when the current ride height for the second axle and/or the second angle may be dynamically changing, the variation of rotational speed of the first drive shaft may also be changing, and thereby, the current ride height of the first axle may also be changing. Therefore, using the ride height of the second axle and/or the second angle as inputs in the predefined model, the predefined model may account for these dynamic changes when used for estimating the ride height of the first axle.

In some examples, the predefined model is a machine learning model. The machine learning model is trained at least partly based on obtaining a training variation in rotational speed of the first drive shaft, and obtaining a training ride height of the first axle by deriving the training ride height of the first axle based on a plurality of measurements from a suspension sensor of the vehicle.

In this way, the ride height estimation of the first axle may be performed more efficiently and/or accurately. This is since the machine learning model can learn to map the inputs to the predefined model to the correct ride height estimation based on learning the ride height based on the plurality of measurements from a suspension sensor of the vehicle. The machine learning model may further be a reinforcement learning model which is trained continuously based on the suspension sensor of the vehicle while the vehicle is travelling. In this way, the machine learning model may be trained such that its accuracy is always increasing, and can be used as a fallback when the suspension sensor of the vehicle fails.

In some examples, estimating the current ride height of the first axle comprises any one out of:

estimating an increase in current ride height for the first axle when the variation in rotational speed is above a predefined threshold, estimating a decrease in current ride height for the first axle when the variation in rotational speed is below the predefined threshold, and estimating the current ride height for the first axle to be the initial ride height or a predefined ride height when the variation in rotational speed is at the predefined threshold.

In this way, the ride height estimation of the first axle may be performed more efficiently and/or accurately. This is since the current ride height may be estimated using a predefined increase or decrease based on a difference to the predefined threshold. The increase or decrease may be with respect to a previous ride height, e.g., the initial ride height or a predefined ride height.

The predefined threshold may for example be with respect to a variation in rotational speed of the initial ride height or a predefined ride height.

In some examples, obtaining the condition signal indicating that the second angle is fixed within an interval of a predetermined error margin comprises obtaining an indication that the vehicle is in cruise control mode.

In this way, the ride height estimation of the first axle may be performed more efficiently and/or accurately. This is since it may be assumed that the second axle ride height is fixed, and therefore, only the obtained initial ride height of the first axle and the variation in rotational speed of the first drive shaft may be needed for estimating the ride height.

In some examples, obtaining the initial ride height of the first axle comprises any one or more out of:

obtaining an input indicative of the initial ride height of the first axle, obtaining a predetermined initial ride height of the first axle, obtaining a suspension sensor measurement indicative of the initial ride height of the first axle, obtaining an initial ride height of the first axle based on a position of the vehicle.

In some examples, obtaining the initial ride height of the first axle based on the position of the vehicle comprises any of:

receiving a message originating from a secondary vehicle, indicating a ride height of an axle of the secondary vehicle at the position of a first vehicle, and obtaining the ride height from a lookup table based on the position of the first vehicle.

All embodiments of the second aspect are applicable to and combinable with all embodiments of the first aspect, and vice versa.

According to a third aspect of the disclosure, a vehicle comprising a processor device to perform the method according to the second aspect is provided.

According to a fourth aspect of the disclosure, a computer program product is provided. The computer program product comprises program code for performing, when executed by the processor device, the method according to the second aspect.

According to a fifth aspect of the disclosure, a control system comprising one or more control units configured to perform the method according to the second aspect is provided.

According to a sixth aspect of the disclosure, a non-transitory computer-readable storage medium is provided. The computer-readable storage medium comprises instructions, which when executed by the processor device, cause the processor device to perform the method according to the second aspect.

Technical benefits of the third, fourth, fifth, and sixth aspects may respectively correspond to the technical benefits of the first and/or second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
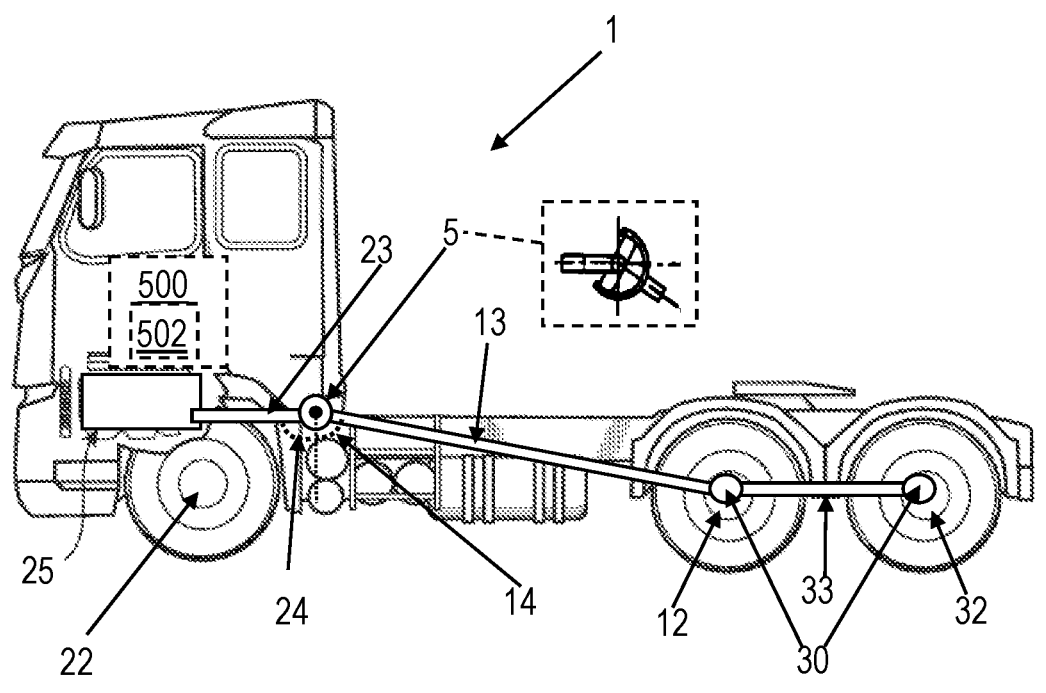
FIG. 1 illustrates a vehicle according to one example.

FIG. 1 is an exemplary system diagram of a vehicle 1 according to one example.

The vehicle 1 may be a manually driven vehicle, a remotely driven vehicle, or an at least partly autonomous vehicle. The vehicle 1 may be capable of driving under a cruise control configuration, e.g., wherein the vehicle 1 is configured to maintain a vehicle speed.

The vehicle 1 may comprise any suitable vehicle, e.g., one or more of a car, bus, heavy-duty vehicle, truck, construction equipment, etc.

The vehicle 1 comprises one or more axles, such as a first axle 12 e.g., a middle axle or a rear axle, and a second axle 22, e.g., a front axle, and optionally a third axle 32, e.g., a rear axle. The vehicle 1 may comprise any suitable number of axles.

Dimensions of the first axle 12 and/or the second axle 22 may be predefined, e.g., length, width, shape, etc.

The vehicle 1 comprises one or more drive shafts, such as a first drive shaft 13 and a second drive shaft 23. A drive shaft as used herein may also be referred to as a propeller shaft. The second drive shaft 23 may be rotated, i.e. driven, by a transmission arrangement 25, e.g., comprising an engine or motor driving the second drive shaft 23.

The transmission arrangement 25 driving the second drive shaft 23 may be carried by the second axle 22. I.e. a ride height of the second axle 22 may determine a height of the transmission arrangement 25 and a height of the end-point of the second drive shaft 23 which may be connected to, and driven by, the transmission arrangement 25.

The first drive shaft 13 is driven by the second drive shaft 23 by the second drive shaft 23 rotating a mechanical joint 5 connected to both the first drive shaft 13 and the second drive shaft 23. In other words, when the second drive shaft 23 is rotated, e.g., by the transmission arrangement 25, then the torque of the second drive shaft rotates the mechanical joint 5 and the first drive shaft 13. As an example, the mechanical joint 5 is illustrated as a universal joint in the dashed box of FIG. 1.

Dimensions of the mechanical joint 5 may be predefined, e.g., length, width, shape, etc.

When the second drive shaft 23 rotates the mechanical joint 5, the first drive shaft 13 may be rotated by the mechanical joint 5. The rotational speed of the first drive shaft 13 may have a variation over a period of time due to a property of the mechanical joint 5. The property of the mechanical joint 5 may cause the first drive shaft 13 to have a rotation that varies over a time period, even if the second drive shaft 23 rotates with a constant rotational speed. The variation in rotational speed is based on angle between the first drive shaft and the second drive shaft with respect to the mechanical joint 5.

The mechanical joint 5 may be a universal joint or similar joint which manifests the above-mentioned property, i.e. the mechanical joint 5 is not a constant-velocity joint. The types of joints which manifests the above-mentioned property of the mechanical joint 5, e.g., universal joints, are cheaper, more durable, and more commonly found in heavy-duty vehicles such as in the vehicle 1.

The variation in rotational speed of the first drive shaft 13 is determined based on a total angle between the first drive shaft 13 and the second drive shaft 23 with respect to the mechanical joint 5. The first drive shaft 13 has a first angle 14 to the mechanical joint 5. The second drive shaft 23 has a second angle 24 to the mechanical joint 5. The total angle between the first drive shaft 13 and the second drive shaft 23 may be the sum of the first angle 14 and the second angle 24.

When a ride height of the second axle 22, or any other indication thereof can be obtained, then the first angle 14 and the second angle 24 may determine a ride height of the first axle 12.

A ride height of the second axle 22 may be fixed, e.g., when the vehicle 1 is under cruise control. The ride height of the second axle 22 may be fixed When the ride height of the second axle 22 is fixed, or when the second angle 24 is obtained based on the ride height of the second axle 22, then, since the variation of rotational speed in the first drive shaft 13 varies based on the first angle 14 and second angle 24, then based on obtaining the variation in rotational speed of the first drive shaft 13, a current ride height of the first axle 12 may be determined based on the variation in the rotational speed of the first drive shaft 13. The current ride height may be determined based on an initial ride height, predetermined or previously measured.

When the ride height of the second axle 22 is dynamically changing, then determining the ride height of the second axle 22 and/or determining the second angle 24 and/or determining the first angle 12 may be necessary before the variation in rotational speed of the first drive shaft can be used to determine the ride height of the first axle 12. Dynamically changing in this example may mean that the second axle 22 has a ride height which varies more than a threshold for a set time period. This is since the first angle 14 and the second angle 24 both may change when any of the ride height of the first axle 12 and/or the ride height of the second axle 22 changes, e.g., as the mechanical joint 5 may move in any suitable direction.

The first drive shaft may in some examples drive a third drive shaft 33. The first drive shaft 12 may drive the third drive shaft 33, e.g., using a mechanical joint such as a universal joint. Examples and embodiments herein may further comprise estimating the ride height of the third drive shaft 33 by a rotational variation of the third drive shaft 33 and e.g., based on an obtained ride height of the first axle 12.

The vehicle 1 may further comprise differential carriers 30, e.g., comprised in the first axle 12 and/or in the third axle 32, e.g., for converting a rotation of the first drive shaft 13 and/or the rotation of the third drive shaft 33 into a rotation of wheels attached to the first axle 12 and/or the third axle 32.

The vehicle 1 may be equipped with any one or more sensors (not shown) suitable for measuring, estimating and/or determining any parameters and/or values necessary to perform embodiments herein.

The vehicle 1 may for example comprise any one or more out of:

- at least one alternative ride height sensor, e.g., for measuring a ride height of the first axle 12 and/or the second axle 22,
- at least one angle sensor, e.g., for measuring the first angle 14 and/or the second angle 24,
- at least one wheel speed sensor, e.g., for measuring rotational speed of wheels of the first axle 12 and/or rotational speed of wheels of the second axle 22,
- at least one drive shaft sensor, e.g., for measuring rotational speed of the first drive shaft 13 and/or the second drive shaft 23, and
- a positioning sensor, e.g., Global Navigation Satellite Systems (GNSS) such as Global Positioning System (GPS).

For some exemplary embodiments herein, any one or more rotational components of the vehicle 1 may have a sensor measuring its rotational angle, e.g., which sensor data may be used for any suitable example or embodiment herein.

Exemplary embodiments herein may be performed at least partly by a computer system 500, and/or a processor device 502 therein. The computer system 500 may be comprised in the vehicle 1, or may be comprised in a remote location communicatively coupled to the vehicle 1, e.g., in a server or control station e.g., which may be arranged to at least partly remotely control and/or to provide instructions such to the vehicle 1. The computer system 700 and/or the processor device 702 therein may further, directly or indirectly, control and/or communicate with any suitable entity comprised in the vehicle 1, e.g., sensors of the vehicle 1. The computer system 700 and/or the processor device 702 therein may further be able to select a candidate path for the first vehicle 1 to travel.

For some exemplary embodiments herein, a current ride height for first axle 12 may only be estimated during any one or more out of the following conditions:

- a high load on the first axle 12,
- a cruise control configuration of the vehicle 1,
- an obtained indication that a ride height of the second axle 22 is fixed and/or stable over a predefined time period,
- an obtained indication that the second angle 24 is fixed and/or stable over a predefined time period,
- a fault in at least one other sensor and/or method for estimating a ride height of the first axle 12, and
- an obtained accuracy of an estimated ride height by at least one other sensor and/or method for estimating a ride height of the first axle 12, is below an accuracy threshold,
- an obtained indication for a need to verify another ride height estimation of the first axle 12.

The one or more above-mentions conditions may be obtained as a condition signal by the vehicle 1, triggering the vehicle 1 to perform ride height estimation of the first axle 12, based at least partly on the variation in rotational speed of the first drive shaft 13.

Figure 2:
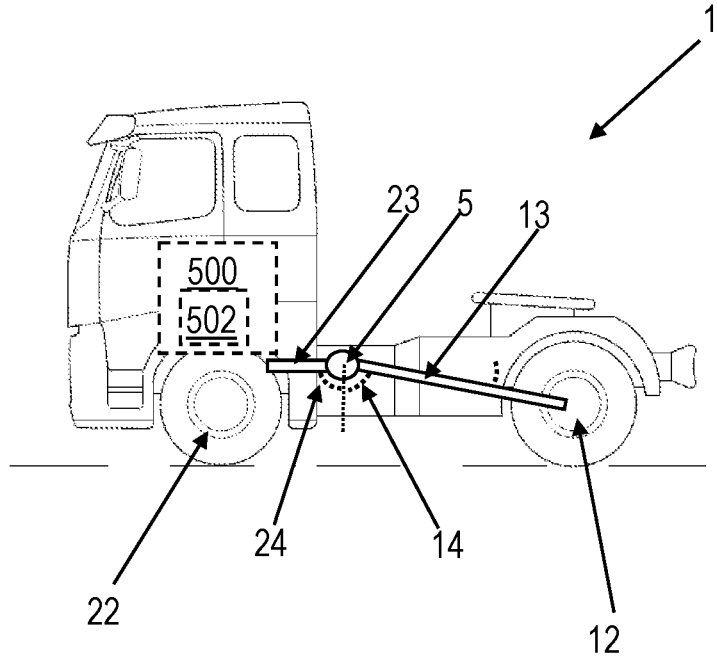
FIG. 2 is another view of FIG. 1, according to another example.

FIG. 2 is another view of FIG. 1, according to another example.

The computer system 500 comprising the processor device 502 is configured to estimate a current ride height of the first axle 12 of the vehicle 1. The first axle 12 is connected to the first drive shaft 13. The first drive shaft 13 is driven by the second drive shaft 23, by the second drive shaft 23 rotating the mechanical joint 5 connected to both the first drive shaft 13 and the second drive shaft 23. The first drive shaft 13 has a first angle 14 to the mechanical joint 5. The second drive shaft 23 has a second angle 24 to the mechanical joint 5. The current ride height of the first axle 12 is at least partly determined by the first angle 14 and the second angle 24.

The processor device 502 is further configured to obtain an initial ride height of the first axle 12.

The processor device 502 is further configured to, for a predetermined time period, obtain a variation in rotational speed of the first drive shaft 13. The variation in rotational speed is caused at least partially by the first angle 14 and the second angle 24.

The processor device 502 is further configured to obtain a condition signal indicating any one or more out of:

- that the second angle 24 is fixed within an interval of a predetermined error margin, and
- a current ride height of a second axle 22. The current ride height of the second axle 22 at least partly determines the second angle 24.

The processor device 502 is further configured to estimate the current ride height of the first axle 12 based on the variation in rotational speed of the first drive shaft 13, the obtained initial ride height of the first axle 12, and the condition signal.

Figure 3:
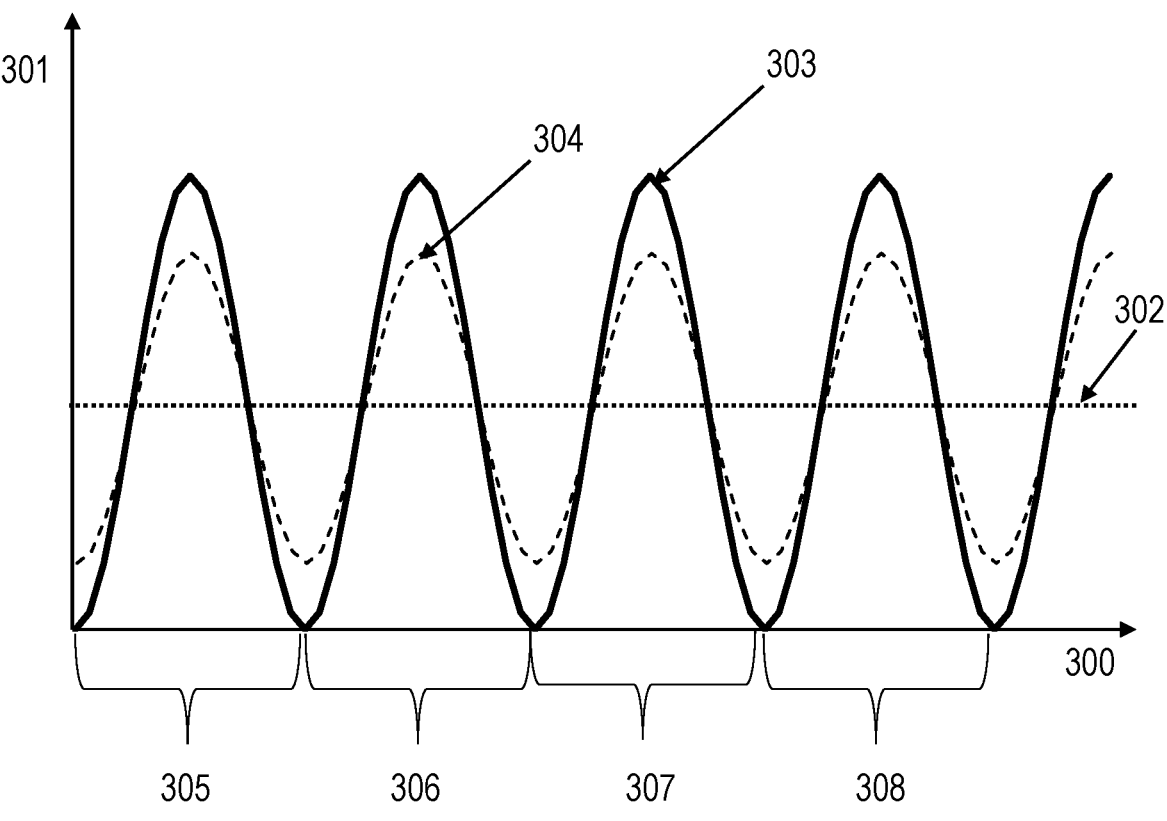
FIG. 3 is an exemplary illustration of variations in rotational speed of a drive shaft.

FIG. 3 is an exemplary illustration of variations in rotational speed of the first drive shaft 13 at different angles to the second drive shaft 23.

The Y-axis 301 illustrates a rotational speed of the first drive shaft 13, e.g., a shaft rotational speed in Revolutions Per Minute (RPM).

The X-axis 302 illustrates angular rotation of the second drive shaft 23 and/or the first drive shaft 13, i.e. as they have the same angular rotation, only the rotational speed will differ due to the mechanical joint 5.

The dotted line 302 represents the rotational speed of the second drive shaft 23, i.e. an input rotational speed to the mechanical joint 5 and/or the first drive shaft 13. The dotted line 302 would also represent the rotational speed of the first drive shaft 13 if the angle between the first drive shaft 13 and the second drive shaft 23 was exactly 180 degrees and/or if the mechanical joint was a constant velocity joint, i.e. a joint which produces a same output rotational speed as an input rotational speed. However, the mechanical joint 5, e.g., typically a universal joint, produces a different output rotational speed for a set input rotational speed when there is an angle between the shafts different from 180 degrees.

The curve 303 represents the rotational speed of the first drive shaft 13 at a first angular configuration of the first drive shaft 13 and the second drive shaft 23.

The dashed curve 304 represents the rotational speed of the first drive shaft 13 at a second angular configuration of the first drive shaft 13 and the second drive shaft 23.

The curve 303 has an increased variation in rotational speed compared to the dashed curve 304. This is since in the first angular configuration, the angle formed between the first drive shaft 13 and the second drive shaft 23, e.g., 100 degrees, is closer to a 90 degree angle than in the second angular configuration, e.g., 120 degrees.

For a 180 degree angle formed between the first drive shaft 13 and the second drive shaft 23, no variation in rotational speed would occur. I.e. when the angle formed between the first drive shaft 13 and the second drive shaft 23 is closer to 180 degrees, a lower variation in rotational speed will occur.

To further illustrate the differences in angles:

1) As an example, for some configurations, when the angle formed between the first drive shaft 13 and the second drive shaft 23 is 100 degrees, a maximum increase and decrease in rotational speed of the first drive shaft 13 compared to the second drive shaft 23 may be 54 percent.

2) As another example, for some configurations, when the angle formed between the first drive shaft 13 and the second drive shaft 23 is 98 degrees, a maximum increase and decrease in rotational speed of the first drive shaft 13 compared to the second drive shaft 23 may be 2 percent.

The curve 303 and the dashed curve 304 varies over different phases.

For a first phase 305, the second drive shaft 23 is rotated from 0 to 90 degrees around e.g., clockwise or counter-clockwise around its own center. The rotation causes the mechanical joint 5 to rotate, which further causes the first drive shaft 13 to rotate. In the first phase 305, the rotational speed of the first drive shaft 13 is increasing for the curve 303 and the dashed curve 304.

For a second phase 306, the second drive shaft 23 is rotated from 90 degrees to 180 degrees around e.g., clockwise or counter-clockwise around its own center. The rotation causes the mechanical joint 5 to rotate, which further causes the first drive shaft 13 to rotate. In the second phase 306, the rotational speed of the first drive shaft 13 is decreasing for the curve 303 and the dashed curve 304.

For a third phase 307, the second drive shaft 23 is rotated from 180 to 270 degrees around e.g., clockwise or counter-clockwise around its own center. The rotation causes the mechanical joint 5 to rotate, which further causes the first drive shaft 13 to rotate. In the third phase 307, the rotational speed of the first drive shaft 13 is increasing for the curve 303 and the dashed curve 304.

For a fourth phase 308, the second drive shaft 23 is rotated from 270 degrees to 360 degrees around e.g., clockwise or counter-clockwise around its own center, e.g., back to the 0 degrees as in the first phase 305. The rotation causes the mechanical joint 5 to rotate, which further causes the first drive shaft 13 to rotate. In the fourth phase 308, the rotational speed of the first drive shaft 13 is decreasing for the curve 303 and the dashed curve 304. After the fourth phase 308, the rotation of the first drive shaft 13 may iterate over the phases 305-308, e.g., and start again with the first phase 305, etc.

The first phase 305 to the fourth phase 308 correspond to one revolution of the first drive shaft 13 and the second drive shaft 23 respectively.

As an example, the difference in rotational speed may as shown above, be different for different angles between the first drive shaft 13 and the second drive shaft 23, e.g., first angle 14 and second angle 24. Hence, if we know the ride height of the second axle 22, and/or by obtaining the configuration of the second drive shaft 23, the current ride height of the first axle 12 may be determined based on the rotational variation speed of the first drive shaft 13. If the ride height of the second axle 22 is unknown, the ride height of the second axle 22 may first need to be estimated.

In above examples, the rotational angle of the second drive shaft 23, i.e. how many degrees the second drive shaft 23 is rotated around the center of the second drive shaft 23 is the same rotational angle as how many degrees the first drive shaft 13 is rotated around the center of the first drive shaft 13. In other words, the rotation of the first drive shaft 13 and the second drive shaft 23 is the same in terms of degrees in angles, but the rotational/angular speed is different for different angles.

Figure 4:
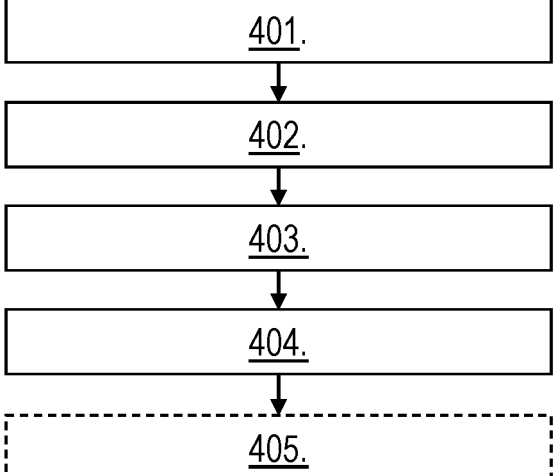
FIG. 4 is a flow chart of an exemplary method to estimate a ride height according to one example.

FIG. 4 is a flow chart of an exemplary computer-implemented method for estimating a current ride height of a first axle 12 of the vehicle 1, according to one example. The first axle 12 is connected to the first drive shaft 13. The first drive shaft 13 is driven by a second drive shaft 23, by the second drive shaft 23 rotating the mechanical joint 5 connected to both the first drive shaft 13 and the second drive shaft 23. The first drive shaft 13 having the first angle 14 to the mechanical joint 5. The second drive shaft 23 having the second angle 24 to the mechanical joint 5. The current ride height of the first axle 12 is at least partly determined by the first angle 14 and the second angle 24. It shall be noted that while the current ride height of the first axle 12 is at least partly determined by the first angle 14 and the second angle 24, the first angle 14 and/or the second angle 23 is not needed to be determined to estimate the current ride height of the first axle 12, e.g., as it is possible due to the properties of the mechanical joint 5, to estimate the ride height of the first axle 12 using the variation in rotational speed of the first drive shaft 13, which will be explained in the following actions.

The method may be performed by the processor device 502 of the computer system 500. The method may perform the following actions which be taken in any suitable order. Action 401.

The method comprises, by the processor device 502 of the computer system 500, obtaining 401 an initial ride height of the first axle 12.

In some exemplary embodiments, obtaining the initial ride height of the first axle 12 comprises any one or more out of:

- obtaining an input indicative of the initial ride height of the first axle 12, e.g., an input from a user of the vehicle 1,
- obtaining a predetermined initial ride height of the first axle 12,
- obtaining a sensor measurement indicative of the initial ride height of the first axle 12, e.g., from a suspension sensor of the first axle 12,
- obtaining an initial ride height of the first axle 12 based on a position of the vehicle 1.

Obtaining the initial ride height of the first axle 12 based on the position of the vehicle 1 may comprise obtaining, e.g., from a lookup table, a ride height of the position of the vehicle 1. The lookup table may further comprise a confidence in the initial ride height, e.g., and the initial ride height may in these exemplary embodiments only be used if the confidence exceeds a threshold. The obtained ride height may be based on the ride height of the first axle 12 when the vehicle 1 previously travelled the position.

Additionally or alternatively, obtaining the initial ride height of the first axle 12 based on the position of the vehicle 1 may comprise receiving a message originating from a secondary vehicle. The message indicates a ride height of an axle of the secondary vehicle at the position of the first vehicle 1.

Action 402.

The method comprises, by the processor device 502, for a predetermined time period, obtaining a variation in rotational speed of the first drive shaft 13. The variation in rotational speed is caused at least partially by the first angle 14 and the second angle 24.

The predetermined time period may be any suitable time period, e.g., the time of one revolution of the second drive shaft 23, a set time, e.g., 1 second, however, in some example scenarios the predetermined time periods is equivalent to one revolution of the second drive shaft 23.

For some examples, the first drive shaft 13 and/or the second drive shaft 23 spin at around 600-1200 RPM which corresponds to 10-20 revolutions per second. In such examples, the sampling rate for measuring the rotational speed and/or variation in rotational speed of the first drive shaft 13 and/or the second drive shaft 23 may be 100 Hz or higher.

The rotational speed of the first drive shaft 13 may have a variation over the predetermined time period due to a property of the mechanical joint 5 affecting an output rotational speed based on the first angle 14 and the second angle 24. The property of the mechanical joint 5 may cause the first drive shaft 13 to have a rotation that varies over the predetermined time period based on the first angle 14 and the second angle 24, even if the second drive shaft 23 rotates with a constant rotational speed during said predetermined time period.

In some exemplary embodiments, obtaining the variation in rotational speed of the first drive shaft 13 comprises obtaining the rotational speed of the first drive shaft 13 during the predetermined time period from a sensor, e.g., a drive shaft sensor of the first drive shaft 13, measuring the rotation of the first drive shaft 13. The variation in rotational speed of the first drive shaft 13 may be determined based on the obtained rotational speed of the first drive shaft 13 during the predetermined time period.

In some exemplary embodiments, obtaining the variation in rotational speed of the first drive shaft 13 comprises obtaining a first wheel speed of a first wheel of the first axle 12, and obtaining a second wheel speed of a second wheel of the second axle 22. Wheel speed as used herein may be the respective rotational speed of the respective wheel. In these exemplary embodiments, obtaining the variation in rotational speed of the first drive shaft 13 further comprises estimating the variation in rotational speed of the first drive shaft 13 by comparing the first wheel speed and the second wheel speed during the predetermined time period. The comparison of the first wheel speed and the second wheel speed during the predetermined time period may be mapped to the variation in rotational speed of the first drive shaft 13, e.g., based on heuristics and/or a predefined model, such as a machine learning model. Such a predefined model and/or machine learning model may be trained using the wheel speeds of the first wheel and the second wheel combined with a value for the variation in rotational speed of the first drive shaft 13 as a ground truth, e.g., by using a drive shaft sensor during a training phase of the predefined model and/or machine learning model.

Action 403.

The method comprises, by the processor device 502, obtaining a condition signal indicating any one or more out of:

1) that the second angle 24 is fixed within an interval of a predetermined error margin,
2) a current ride height of a second axle 22. The current ride height of the second axle 22 may be estimated or measured using any suitable method.

In other words, exemplary embodiments herein may need an indication 1) that the second angle is fixed, i.e., the current ride height of a second axle 22 is assumed to be static or fixed over a period of time. In other scenarios, exemplary embodiments herein may need to account for that the ride height of the second axle 22 may be changing dynamically, and thus the ride height of the second axle 22 may need to be measured or estimated.

Obtaining the condition signal indicating that the second angle 24 is fixed within an interval of a predetermined error margin comprise any one or more out of:

- obtaining an indication that the vehicle 1 is in a cruise control mode, i.e. the vehicle 1 is indicated to have a constant vehicle speed, and
- obtaining sensor data over a time period, the sensor data indicating that the ride height of the second axle 22 is fixed over a period of time, e.g., the sensor data may be obtained from one or more alternative ride height sensors, such as any one or more out of: a suspension ride height sensor of the second axle 22.

The current ride height of the second axle 22 at least partly determines the second angle 24. The current ride height of the second axle 22 may further at least partly determine the second angle 24. This is since the ride height of the second axle 22 affects an angle between the first drive shaft 13 and the second drive shaft 23 with respect to the mechanical joint 5. When the sum of the first angle 14 and the second angle 24 is closer to 180 degrees, the variation in rotational speed of the first drive shaft 13 will be lower compared to when the sum of the first angle 14 and the second angle 24 is closer to 90 degrees. When the sum of the first angle 14 and the second angle 24 is 180 degrees, the variation in rotational speed of the first drive shaft 13 will be 0. When the sum of the first angle 14 and the second angle 24 is 90 degrees, the variation in rotational speed of the first drive shaft 13 will be at a maximum, e.g., which maximum may be based on a property of the mechanical joint 5, e.g., dependent on the type or model of mechanical joint.

Action 404.

The method comprises, by the processor device 502, estimating the current ride height of the first axle 12 based on the variation in rotational speed of the first drive shaft 13, the obtained initial ride height of the first axle 12, and the condition signal.

When the condition signal indicates that the second angle 24 is fixed within an interval of a predetermined error margin, then estimating the current ride height of the first axle 12 may comprise estimating the current ride height of the first axle 12 to be an adjusted initial ride height, e.g., the initial ride height being adjusted based on the variation in rotational speed of the first drive shaft 13. For example, the obtained initial ride height may be adjusted based on a change in the variation in rotational speed, e.g., wherein the initial ride height is associated with an initial variation in rotational speed of the first axle 12, e.g., the initial variation in rotational speed of the first axle 12 may be any one or more out of: measured, predetermined, and estimated.

In some exemplary embodiments, estimating the current ride height of the first axle 12 comprises using a predefined model for estimating the current ride height of the first axle 12 by the use of one or more inputs. The predefined model may for example be modelled based on a ground truth, e.g., from an alternate ride height sensor of the vehicle 1, and the one or more input. In other words, the one or more inputs may at least partly map to the ground truth of the ride height. The one or more inputs comprises at least the variation in rotational speed of the first drive shaft 13, and the obtained initial ride height of the first axle 12.

In some exemplary embodiments, using the predefined model comprises: when the condition signal indicates the current ride height for the second axle 22, the one or more inputs further comprises an indication of the current ride height for the second axle 22 and/or an indication of the second angle 24 as derived based on the current ride height of the second axle 22 and the obtained initial ride height of the first axle 12. In other words, when the second axle 22 and/or the second angle 24 is not fixed, the second ride height and/or the second angle 24 caused thereby need to be accounted for in the predefined model. This is since the ride height of the second axle 22 affects the variation of rotational speed of the first axle 12.

In some exemplary embodiments, the predefined model is a machine learning model. In some of these examples, the machine learning model is trained at least partly based on obtaining a training variation in rotational speed of the first drive shaft 13, and obtaining a training ride height of the first axle 12 by deriving the training ride height of the first axle 12 based on a plurality of measurements from a sensor of the vehicle 1, e.g., a suspension sensor of the vehicle 1. Obtaining the training variation in rotational speed of the first drive shaft 13 may be obtained by obtaining the variation in rotational speed of the first drive shaft 13 as for any other example used herein. Obtaining the training ride height of the first axle 12 by deriving the training ride height of the first axle 12 based on the plurality of measurements from the sensor of the vehicle 1 may comprise obtaining any suitable sensor data indicating the ride height of the first axle 12. In this way, the machine learning model is trained while the vehicle 1 is travelling, and the ride height may only be estimated using the variation in rotational speed of the first axle 12 when e.g., sensor data indicating the ride height using other sensor data is not obtainable or indicated to be faulty/inaccurate.

In some of these examples, the machine learning model may be a reinforcement learning model trained using a ride height of the first axle 12 estimated by the use of a suspension sensor in the vehicle 1.

In some exemplary embodiments, estimating the current ride height of the first axle 12 comprises any one out of:

estimating an increase in current ride height for the first axle 12 when the variation in rotational speed is above a predefined threshold, estimating a decrease in current ride height for the first axle 12 when the variation in rotational speed is below the predefined threshold, and estimating the current ride height for the first axle 12 to be the initial ride height or a predefined ride height when the variation in rotational speed is at the predefined threshold.

In one example, the predefined threshold may be an estimated, predicted, expected, measured, and/or predefined variation in rotational speed of a previously obtained ride height of the first axle, e.g., the initial ride height.

In one example, the predefined threshold may be a measured and/or predefined variation in rotational speed of a predefined configuration of the first angle 14 and the second angle 24, e.g., when their total angle is 180 degrees meaning no variation in rotational speed of the first drive shaft 13, or when their total angle is 90 degrees meaning a predefined maximum rotational speed of the first drive shaft 13. The predefined maximum, rotational speed of the first drive shaft 13 may be theoretical if the total angle could add up to 90 degrees, which scenario may not be possible or likely for the vehicle 1 but may be used as a reference.

Action 405.

As an exemplary use case for the ride height estimation, the method may comprise, by the processor device 502, using the estimated current ride height of the first axle 12 to any one or more out of:

verify a ride height estimation from an alternative ride height sensor of the vehicle 1, estimate a fuel efficiency of the vehicle 1 at least partly based on the estimated ride height of action 304, estimate a comfort level of users of the vehicle 1 at least partly based on the estimated ride height of action 304, e.g., based on a change in ride height over a time period, optimize a traction of the vehicle 1, optimize and/or estimate a tire wear of the vehicle 1 based on load transfer effect of the estimated ride height, and configure the vehicle 1 to use the estimated ride height for a predefined mode, e.g., a ferry mode or a docking mode etc.

Figure 5:
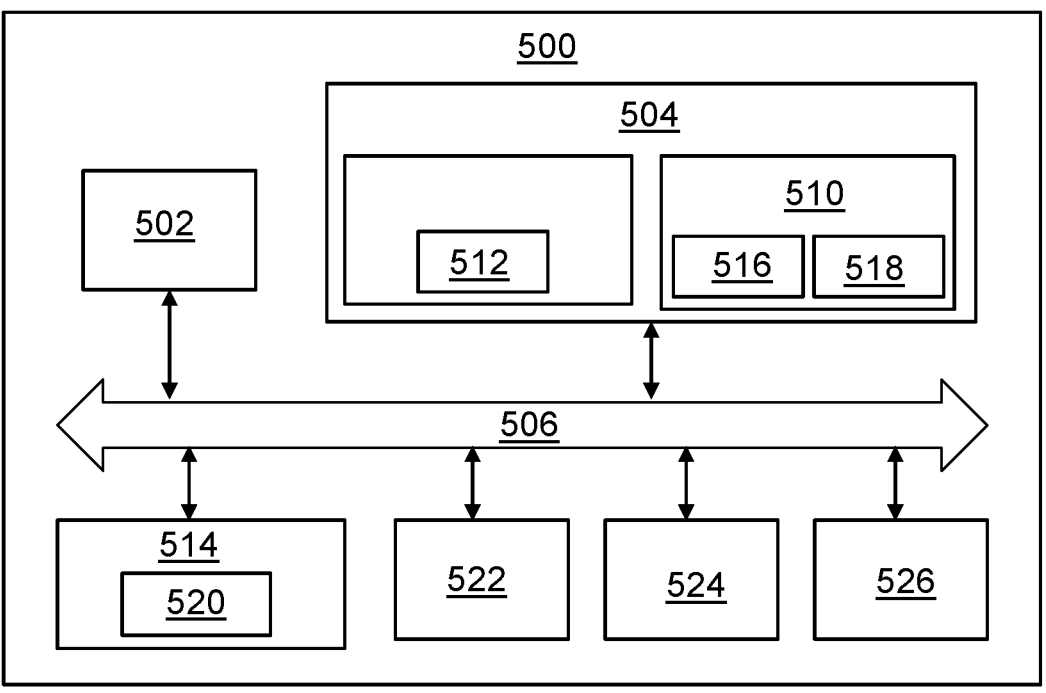
FIG. 5 is a schematic diagram of an exemplary computer system for implementing examples disclosed herein, according to one example.

FIG. 5 is a schematic diagram of the computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include the processor device 502 (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code can comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A system for estimating a current ride height of a first axle of a vehicle, wherein the first axle is connected to a first drive shaft, the first drive shaft being driven by a second drive shaft by the second drive shaft rotating a mechanical joint connected to both the first drive shaft and the second drive shaft, the first drive shaft having a first angle to the mechanical joint, and the second drive shaft having a second angle to the mechanical joint, and wherein the current ride height of the first axle is at least partly determined by the first angle and the second angle, the system comprising:

one or more sensors comprising:
    a ride height sensor,
    an angle sensor,
    a drive shaft sensor;
a processor device configured to:
    obtain an initial ride height of the first axle from the ride height sensor;
    for a predetermined time period, obtain a variation in rotational speed of the first drive shaft from the drive shaft sensor, the variation in rotational speed being caused at least partially by the first angle and the second angle, wherein at least one of the first angle or second angle are determined from the angle sensor;
obtain a condition signal from at least one the one or more sensors, the condition signal indicating any one or more out of:
    that the second angle is fixed within an interval of a predetermined error margin, or
    a current ride height of a second axle, wherein the current ride height of the second axle at least partly determines the second angle; and
estimate the current ride height of the first axle based on the variation in rotational speed of the first drive shaft, the obtained initial ride height of the first axle, and the condition signal.

2. A method for estimating a current ride height of a first axle of a vehicle, the first axle being connected to a first drive shaft, the first drive shaft being driven by a second drive shaft by the second drive shaft rotating a mechanical joint connected to both the first drive shaft and the second drive shaft, the first drive shaft having a first angle to the mechanical joint, and the second drive shaft having a second angle to the mechanical joint, and wherein the current ride height of the first axle is at least partly determined by the first angle and the second angle, the method comprising:
    providing one or more sensors comprising a drive shaft sensor, and a ride height sensor;
    obtaining an initial ride height of the first axle from the ride height sensor;
    for a predetermined time period, obtaining a variation in rotational speed of the first drive shaft from the drive shaft sensor, the variation in rotational speed being caused at least partially by the first angle and the second angle;
    obtaining a condition signal from at least one of the one or more sensors, the condition signal indicating any one or more out of:
        that the second angle is fixed within an interval of a predetermined error margin,
        a current ride height of a second axle, wherein the current ride height of the second axle at least partly determines the second angle; and
    estimating the current ride height of the first axle based on the variation in rotational speed of the first drive shaft, the obtained initial ride height of the first axle, and the condition signal.

3. The method of claim 2, wherein obtaining the variation in rotational speed of the first drive shaft comprises:
    obtaining a first wheel speed from a first wheel speed sensor of a first wheel of the first axle,
    obtaining a second wheel speed of a second wheel from a second wheel speed sensor of the second axle, and
    estimating the variation in rotational speed of the first drive shaft by comparing the first wheel speed and the second wheel speed during the predetermined time period.

4. The method of claim 2, wherein estimating the current ride height of the first axle comprises using a predefined model for estimating the current ride height of the first axle by the use of one or more inputs, the one or more inputs comprising at least the variation in rotational speed of the first drive shaft, and the obtained initial ride height of the first axle.

5. The method of claim 4, wherein using the predefined model comprises:

when the condition signal indicates the current ride height for the second axle, the one or more inputs further comprises an indication of the current ride height for the second axle and/or an indication of the second angle as derived based on the current ride height of the second axle and the obtained initial ride height of the first axle.

6. The method of claim 4, wherein the predefined model is a machine learning model, which machine learning model is trained at least partly based on obtaining a training variation in rotational speed of the first drive shaft, and obtaining a training ride height of the first axle by deriving the training ride height of the first axle based on a plurality of measurements from a suspension sensor of the vehicle.

7. The method of claim 2, wherein estimating the current ride height of the first axle comprises any one out of:

estimating an increase in current ride height for the first axle when the variation in rotational speed is above a predefined threshold, estimating a decrease in current ride height for the first axle when the variation in rotational speed is below the predefined threshold, and estimating the current ride height for the first axle to be the initial ride height or a predefined ride height when the variation in rotational speed is at the predefined threshold.

8. The method of claim 2, wherein obtaining the condition signal indicating that the second angle is fixed within an interval of a predetermined error margin comprises obtaining an indication that the vehicle is in cruise control mode.

9. The method of claim 2, wherein obtaining the initial ride height of the first axle comprises any one or more out of:

obtaining a input indicative of the initial ride height of the first axle, obtaining a predetermined initial ride height of the first axle, obtaining a suspension sensor measurement indicative of the initial ride height of the first axle, obtaining an initial ride height of the first axle based on a position of the vehicle from a positioning sensor.

10. The method of claim 9, wherein obtaining the initial ride height of the first axle based on the position of the vehicle comprises any of:

receiving a message originating from a secondary vehicle, indicating a ride height of an axle of the secondary vehicle at the position of a first vehicle, and obtaining the ride height from a lookup table based on the position of the first vehicle.

11. A vehicle comprising a processor device to perform the method of claim 2.

12. A computer program product comprising program code for performing, when executed by a processor device, the method of claim 2.

13. A control system comprising one or more control units configured to perform the method of claim 2.

14. A non-transitory computer-readable storage medium comprising instructions, which when executed by a processor device, cause the processor device to perform the method of claim 2.

* * * * *